(12) United States Patent
Tungare et al.

(10) Patent No.: US 10,928,900 B2
(45) Date of Patent: Feb. 23, 2021

(54) COMMUNICATION SYSTEMS AND METHODS

(71) Applicant: TECHNOLOGY AGAINST ALS, Parsippany, NJ (US)

(72) Inventors: Sandeep Rajaram Tungare, Morristown, NJ (US); Milind Shrikrishna Gupte, Boonton, NJ (US); Amitabh Patil, Princeton, NJ (US); Bert Haberland, Succasunna, NJ (US)

(73) Assignee: TECHNOLOGY AGAINST ALS, Parsippany, NJ (US)

( * ) Notice: Subject to any disclaimer, the term of this patent is extended or adjusted under 35 U.S.C. 154(b) by 0 days.

(21) Appl. No.: 16/395,605

(22) Filed: Apr. 26, 2019

(65) Prior Publication Data

US 2019/0332170 A1    Oct. 31, 2019

Related U.S. Application Data

(60) Provisional application No. 62/663,805, filed on Apr. 27, 2018.

(51) Int. Cl.
| | |
|---|---|
| *G06F 3/01* | (2006.01) |
| *G06T 7/70* | (2017.01) |
| *H04N 5/33* | (2006.01) |
| *G06F 3/033* | (2013.01) |
| *G06F 3/0482* | (2013.01) |

(52) U.S. Cl.
CPC ............. *G06F 3/013* (2013.01); *G06F 3/012* (2013.01); *G06F 3/0334* (2013.01); *G06F 3/0482* (2013.01); *G06T 7/70* (2017.01); *H04N 5/33* (2013.01); *G06T 2207/10048* (2013.01); *G06T 2207/20084* (2013.01); *G06T 2207/30201* (2013.01)

(58) Field of Classification Search
CPC ...... G06F 3/013; G06F 3/0334; G06F 3/0482; G06F 3/012; G06F 3/16; G06F 3/0346; G06F 3/167; G06T 7/70; G06T 2207/10048; G06T 2207/20084; G06T 2207/30201; G06T 2207/20081; H04N 5/33; G06K 9/00604; G06N 3/08

See application file for complete search history.

(56) References Cited

U.S. PATENT DOCUMENTS

| 6,005,549 A | 12/1999 | Forest |
| 6,637,883 B1 * | 10/2003 | Tengshe ................. A61B 3/113 351/210 |

(Continued)

FOREIGN PATENT DOCUMENTS

WO    2013133618 A1    9/2013

*Primary Examiner* — Rodney Amadiz
(74) *Attorney, Agent, or Firm* — Duane Morris LLP

(57) ABSTRACT

In one aspect, a device includes a body, an arm, a camera, a support arm, an indicator support, and a plurality of indicators. The body is configured to mount to an eyeglass arm. The arm extends from the body. The camera is coupled to the arm and configured to capture images of at least one eye of a user. The support arm extends from the body. The indicator support is coupled to the support arm such that, when the body is mounted to the eyeglasses and the user is wearing the eyeglasses, the indicator support is positioned in the user's field of view. The plurality of indicators are coupled to the indicator support.

20 Claims, 16 Drawing Sheets

(56) References Cited

U.S. PATENT DOCUMENTS

| | | |
|---|---|---|
| 9,129,430 B2 | 9/2015 | Salter |
| 2008/0266596 A1 | 10/2008 | Sato |
| 2010/0013812 A1* | 1/2010 | Gu .................. G06F 3/0346 |
| | | 345/207 |
| 2010/0057645 A1 | 3/2010 | Lauritsen |
| 2010/0100849 A1 | 4/2010 | Fram |
| 2011/0205242 A1 | 8/2011 | Friesen |
| 2012/0019662 A1 | 1/2012 | Maltz |
| 2012/0105486 A1 | 5/2012 | Lankford et al. |
| 2012/0263449 A1* | 10/2012 | Bond ...................... G02C 11/10 |
| | | 396/420 |
| 2012/0278747 A1 | 11/2012 | Abraham |
| 2013/0007668 A1 | 1/2013 | Liu |
| 2013/0024047 A1 | 1/2013 | Kalhous et al. |
| 2013/0114850 A1* | 5/2013 | Publicover ............. H04N 5/247 |
| | | 382/103 |
| 2013/0132885 A1 | 5/2013 | Maynard |
| 2013/0135196 A1 | 5/2013 | Park et al. |
| 2013/0207964 A1 | 8/2013 | Fleck |
| 2014/0009739 A1* | 1/2014 | Greco .................... A61B 3/113 |
| | | 351/206 |
| 2014/0049558 A1 | 2/2014 | Krauss |
| 2014/0085204 A1* | 3/2014 | Jahnke .................. G06F 3/013 |
| | | 345/158 |
| 2014/0304642 A1 | 10/2014 | Santos |
| 2014/0325425 A1 | 10/2014 | Milam |
| 2014/0333665 A1 | 11/2014 | Sylvan |
| 2015/0009313 A1 | 1/2015 | Noda |
| 2015/0049112 A1 | 2/2015 | Liu |
| 2015/0103003 A1 | 4/2015 | Kerr |
| 2015/0317069 A1 | 11/2015 | Clements |
| 2016/0037025 A1* | 2/2016 | Blum .................... G06F 1/1686 |
| | | 348/207.99 |
| 2016/0092062 A1 | 3/2016 | Miyagi |
| 2016/0188181 A1 | 6/2016 | Smith |
| 2016/0195924 A1 | 7/2016 | Weber |
| 2016/0224110 A1* | 8/2016 | Massonneau ........... G06F 3/013 |
| 2016/0246367 A1 | 8/2016 | Tungare et al. |
| 2017/0139567 A1 | 5/2017 | Li |

\* cited by examiner

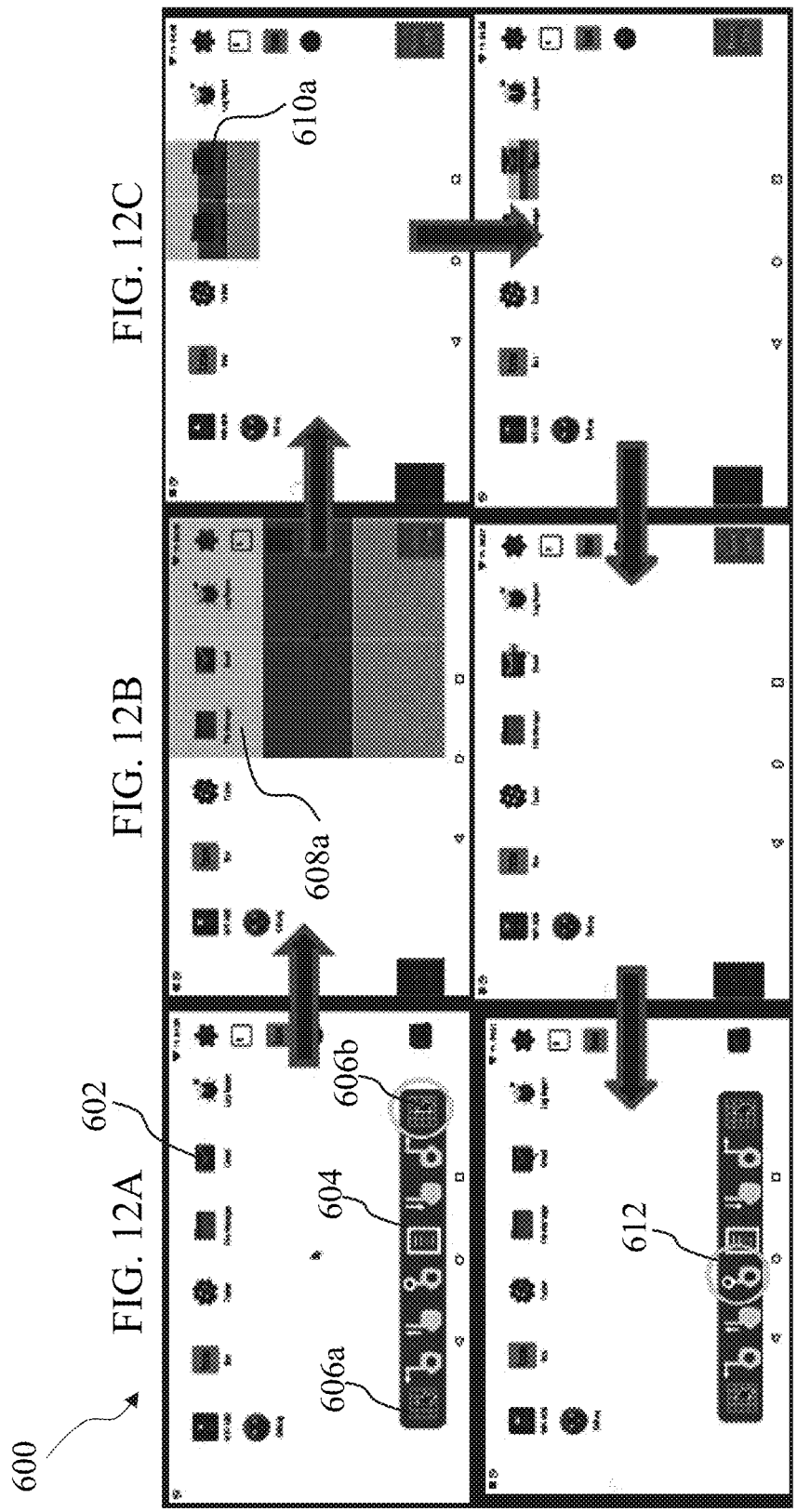

COMMUNICATION SYSTEMS AND METHODS

CROSS-REFERENCE TO RELATED APPLICATIONS

This application claims priority to U.S. provisional patent application No. 62/663,805, filed Apr. 27, 2018, which is incorporated herein by reference in its entirety.

FIELD

The disclosed devices, systems, and methods relate to the field of augmentative and alternative communication devices.

BACKGROUND

Amyotrophic Lateral Sclerosis (ALS) or Locked In Syndrome (LIS) is a neurodegenerative disease that leads to gradual loss of muscle movements throughout the body. Over time, this deteriorates the person's ability to move and eventually speak and breathe. As a result, the patient needs assistive technology to help him/her communicate his/her daily needs or have a normal conversation. In most cases, eye muscles still remain relatively functional and enable eye movement.

Currently available communication systems are either costly, require a large setup to be transported with the patient or have a very limited communication capability. The cost of these systems makes them inaccessible to large parts of the world, even parts of society in the developed world.

SUMMARY

In one aspect, a device includes a body, an arm, a camera, a support arm, an indicator support, and a plurality of indicators. The body is configured to mount to an eyeglass arm. The arm extends from the body. The camera is coupled to the arm and configured to capture images of at least one eye of a user. The support arm extends from the body. The indicator support is coupled to the support arm such that, when the body is mounted to the eyeglasses and the user is wearing the eyeglasses, the indicator support is positioned in the user's field of view. The plurality of indicators are coupled to the indicator support.

In another aspect, a system includes a computing device having a display unit and an eye-gaze tracking device configured to be coupled to eyeglasses. The eye-gaze tracking device includes a body, an arm, a camera, a support arm, an indicator support, and a plurality of indicators. The body is configured to mount to an eyeglass arm. The arm extends from the body. The camera is coupled to the arm and configured to capture images of at least one eye of a user. The support arm extends from the body. The indicator support is coupled to the support arm such that, when the body is mounted to the eyeglasses and the user is wearing the eyeglasses, the indicator support is positioned in the user's field of view. The plurality of indicators are coupled to the indicator support. During operation a communication board is displayed on the display unit and the user selects letters or words from the communication board by directing the user's gaze at one of the plurality of indicators.

In another aspect, a computer-implemented method includes, displaying a user interface on a display unit. The method also includes displaying a first grid over a first region of the user interface, the grid defining a plurality of discrete second regions. The method further includes identifying, of the plurality of discrete second regions, a first selected region. The method further includes displaying a second grid over the first selected region, the second grid defining a plurality of discrete third regions. The method further includes identifying, of the plurality of discrete third regions, a second selected region. The method further includes identifying an icon disposed within the second selected region. The method further includes opening an application associated within the icon.

BRIEF DESCRIPTION OF THE DRAWINGS

The features of the embodiments described herein will be more fully disclosed in the following detailed description, which is to be considered together with the accompanying drawings wherein like numbers refer to like parts and further wherein:

FIGS. 12A-12F show a method of interacting with a graphical user interface using the systems described herein.

DETAILED DESCRIPTION

Figure 1:
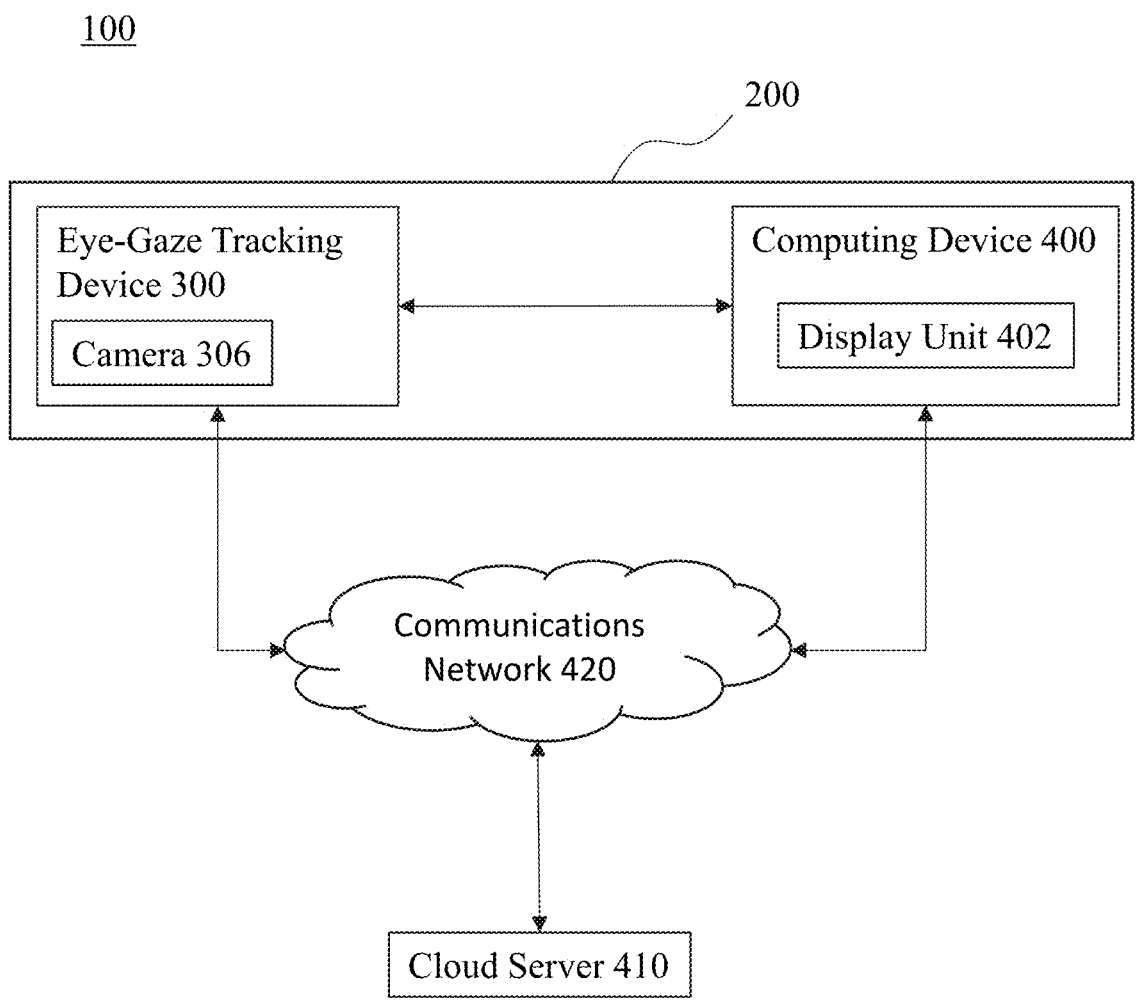
FIG. 1 shows an exemplary computing environment, as described herein in accordance with some embodiments.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

FIG. 1 shows a diagram of a computing environment 100 for allowing a user with limited muscle movement to communicate with others. The computing environment 100 may include a system 200 including an eye-gaze tracking device 300 and a computing device 400 that are communicatively coupled to one another. System 200 may be used by a user with ALS or paralysis to communicate, as described herein; however one of ordinary skill in the art will understand that system 200 may be used by other individuals, including individuals without ALS. Computing device 400 may be, for example, a smartphone, laptop computer, desktop computer, smart TV, Amazon Fire TV, Google Chromecast, or any other computing device. In some embodiments, computing device 400 includes or is communicatively connected to a display unit 402 on which communication boards and other graphical user interfaces may be displayed, as described further herein.

Computing environment 100 may also include a cloud server 410, Cloud server 410 may be a single server or a network of servers (e.g., Microsoft Azure and/or Amazon Web Services ("AWS")). Eye-gaze tracking device 300, computing device 400, and cloud server 410 may communicate via communications network 420. Examples of network 420 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. Further, as described herein, eye-gaze tracking device 300 may communicate with computing device 400 via Bluetooth, Bluetooth Low Energy connections or using Near Field Communication. A person of ordinary skill in the art will understand that network 420 may include wired communication networks.

Eye-Gaze Tracking Device

Figure 2:
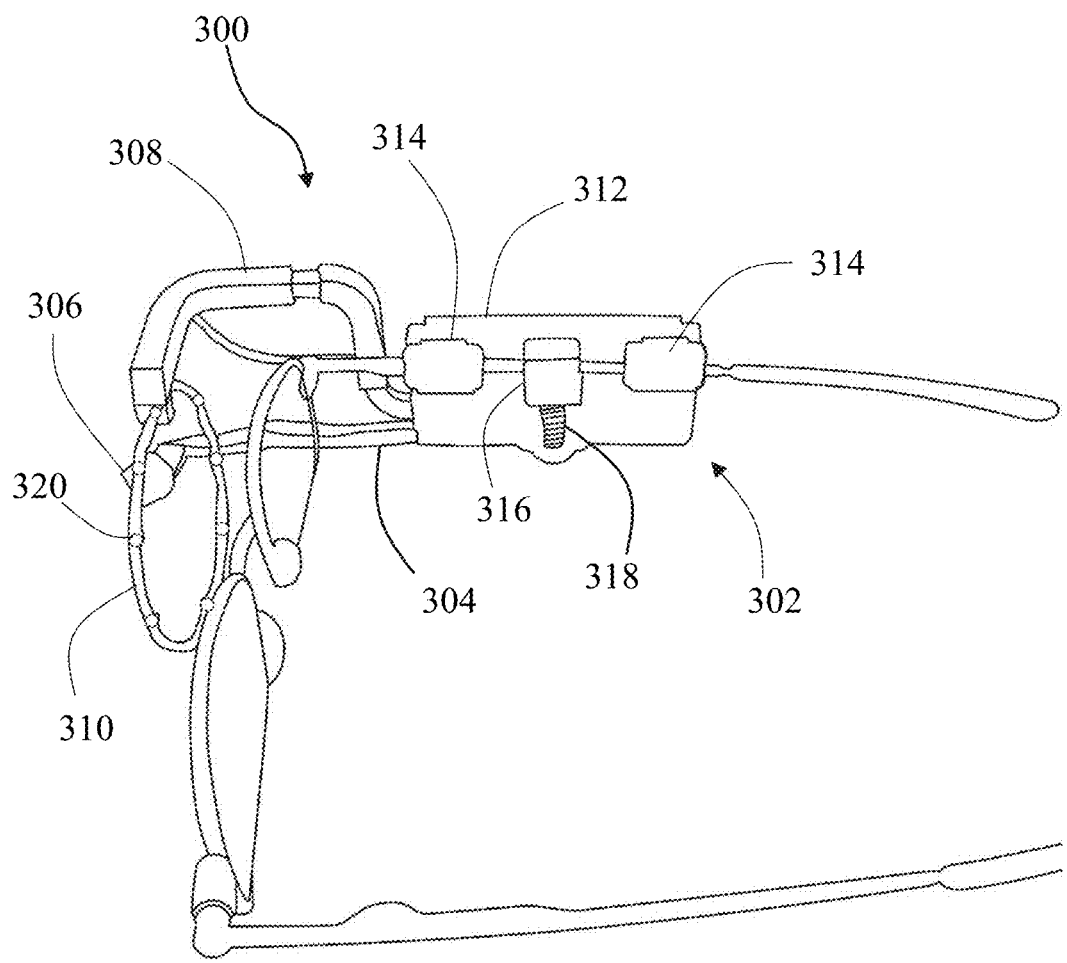
FIG. 2 shows a perspective view of an eye-gaze tracking device, according to some embodiments described herein.

In one aspect described herein, as shown in FIG. 2, an eye-gaze tracking device 300 is configured to allow users to interact with computing device 400, such as to communicate as described herein, using eye movements. As will be described further herein, these eye movements can be converted to text and/or speech. Eye-gaze tracking device 300, in conjunction with a computing device (e.g., computing device 400), may provide the ability to produce speech rates of up to 15-20 wpm (words per minute) using word and sentence prediction algorithms. Further, eye-gaze tracking device 300 in conjunction with a computing device may be used to control other network-connected devices and/or to control other devices that are directly connected to the computing device.

In some embodiments, eye-gaze tracking device 300 can simply be clipped or otherwise removeably secured onto the user's glasses such that even untrained caregivers can help an ALS patient use the systems described herein. Further, eye-gaze tracking device 300 may be manufactured at low cost so that they may be made available to users throughout the world.

In addition, eye-gaze tracking device 300 may be worn in any setting. ALS patients are most vulnerable in unfamiliar surroundings. It is at these critical times that quick and precise communication can help prevent injuries. Eye-gaze tracking device 300 is advantageously small, lightweight and works unobtrusively without requiring a bedroom or hospital setting. In particular, eye-gaze tracking device 300 may be used in un-controlled settings such as while using a wheelchair and/or a handicapped accessible vehicle.

As shown in FIG. 2, eye-gaze tracking device 300 includes a body 302, an arm 304 extending from body 302, a camera 306 coupled to arm 304, a support arm 308, an indicator support 310, and one or more indicators coupled to indicator support 310. In various embodiments, body 302 is configured to mount to an eyeglass arm such that the position of body 302 along the eyeglass arm is adjustable. Body 302 includes a housing 312 for enclosing electronic components, as will be described herein. In various embodiments, housing 312 is made up of multiple components joined together in a sandwich or clamshell configuration. Body 302 may also include one or more mounting blocks 314 configured to receive an arm of the eyeglasses. Mounting blocks 314 may be open on their respective bottom sides to receive the arm of the eyeglasses. Body 302 may further include one or more locking blocks 316. In one embodiment, locking block 316 is biased by a spring 318 toward the top of body 302 to retain body 302 in position on the arm of the eyeglasses in cooperation with mounting blocks 314. Spring 318 may, for example, be a helical compression spring, a conical spring, a disc spring, an elastomeric member, or any member capable of applying a force on locking block 316. Operation of locking block 316 allows the position of body 302 to be adjusted along the length of the arm of the eyeglasses. This may allow for accommodation of different temple heights and thicknesses of the user's eyeglasses.

Camera 306 may be any appropriate type of camera. For example, in one embodiment, camera 306 is a complementary metal-oxide semiconductor (CMOS) camera. In other embodiments, camera 306 is a charge-coupled device (CCD) camera. A person of ordinary skill in the art will understand that other image acquisition units or cameras may be implemented As will be described in more detail herein, in some embodiments, camera 306 is configured to capture infrared images.

Figure 4:
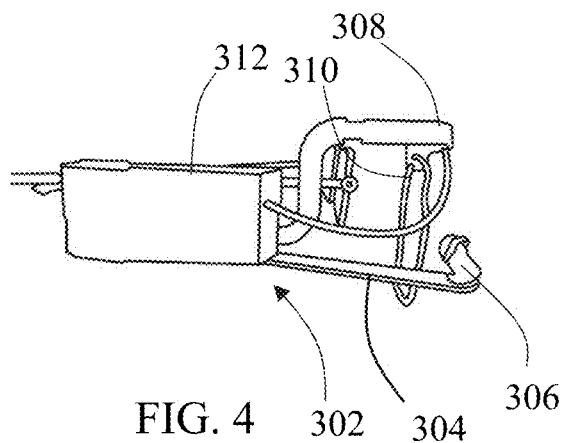
FIG. 4 shows a side view of the eye-gaze tracking device of FIG. 2.
Figure 5:
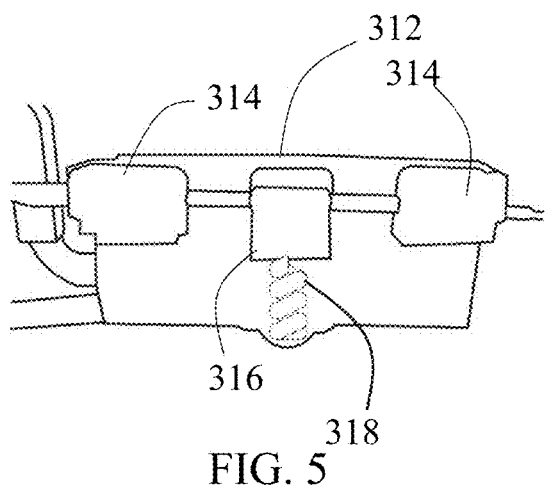
FIG. 5 shows a detail view of a body of the eye-gaze tracking device of FIG. 2.

As shown best in FIG. 4, arm 304 extends from body 302 and supports camera 306. Arm 304 may be coupled to body 302 using any appropriate means. For example, arm 304 may be coupled to body 302 using adhesive or fasteners (e.g., screws, clips). Camera 306 may also be coupled to arm 304 using any appropriate method. Camera 306 may be electrically (or otherwise communicatively) coupled to the electrical components housed within housing 312 using, for example, wires or a ribbon cable supported by arm 304 and/or a wireless protocol. In other embodiments, arm 304 includes conductive tracks coupling camera 306 to such electrical components.

Camera 306 is supported by arm 304 such that it points towards the user's eye and is able to capture the movements of the eye. In some embodiments, camera 306 is supported by arm 304 such that camera 306 is positioned at an angle in front of the user's eye. This may allow camera 306 to accurately capture the user's eye movements. The position and angle of camera 306 may be adjustable. For example, in one embodiment, camera 306 is manually adjustable by the user. In other embodiments, camera 306 may be adjusted automatically. Camera 306 is focused such that the user's eye is captured with sufficient sharpness, contrast and detail to allow the tracking of the position of the pupil.

Figure 3:
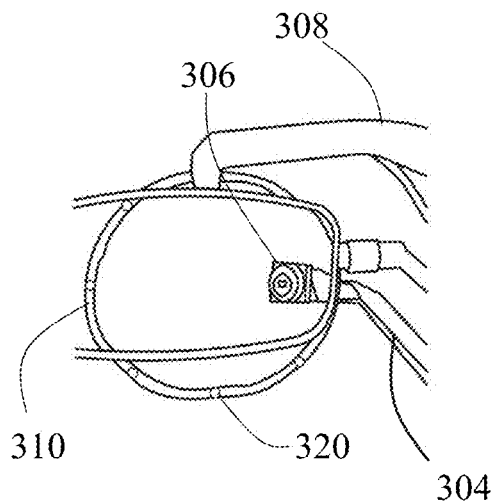
FIG. 3 shows a detail view of an indicator support of the eye-gaze tracking device of FIG. 2.

As shown best in FIG. 3, indicator support 310 supports a plurality of indicators 320. Indicators 320 may be housed within indicator support 310. For example, indicator support 310 may be a hollow tube formed into a circle within which indicators 320 are disposed. In some embodiments, indicators 320 are spaced equidistantly along indicator support 310's circumference. In one embodiment, indicators 320 are LEDs. The LEDs may be connected to electrical components housed within housing 312 (e.g., via wires).

Indicators 320 may be of different colors and are mapped to the display unit used by the patient, as described in more detail herein. For example, in one embodiment, a first indicator on the left of indicator support 310 is green, a second indicator on the left of indicator support 310 is yellow, a third indicator on the left of indicator support 310 is red, another indicator is white, a first indicator on the right of indicator support 310 is green, a second indicator on the right of indicator support 310 is yellow, a third indicator on the right of indicator support 310 is red, and a final indicator is blue. While eight indicators are described, a person of ordinary skill in the art will understand fewer or more indicators 320 may be implemented.

Figure 7:
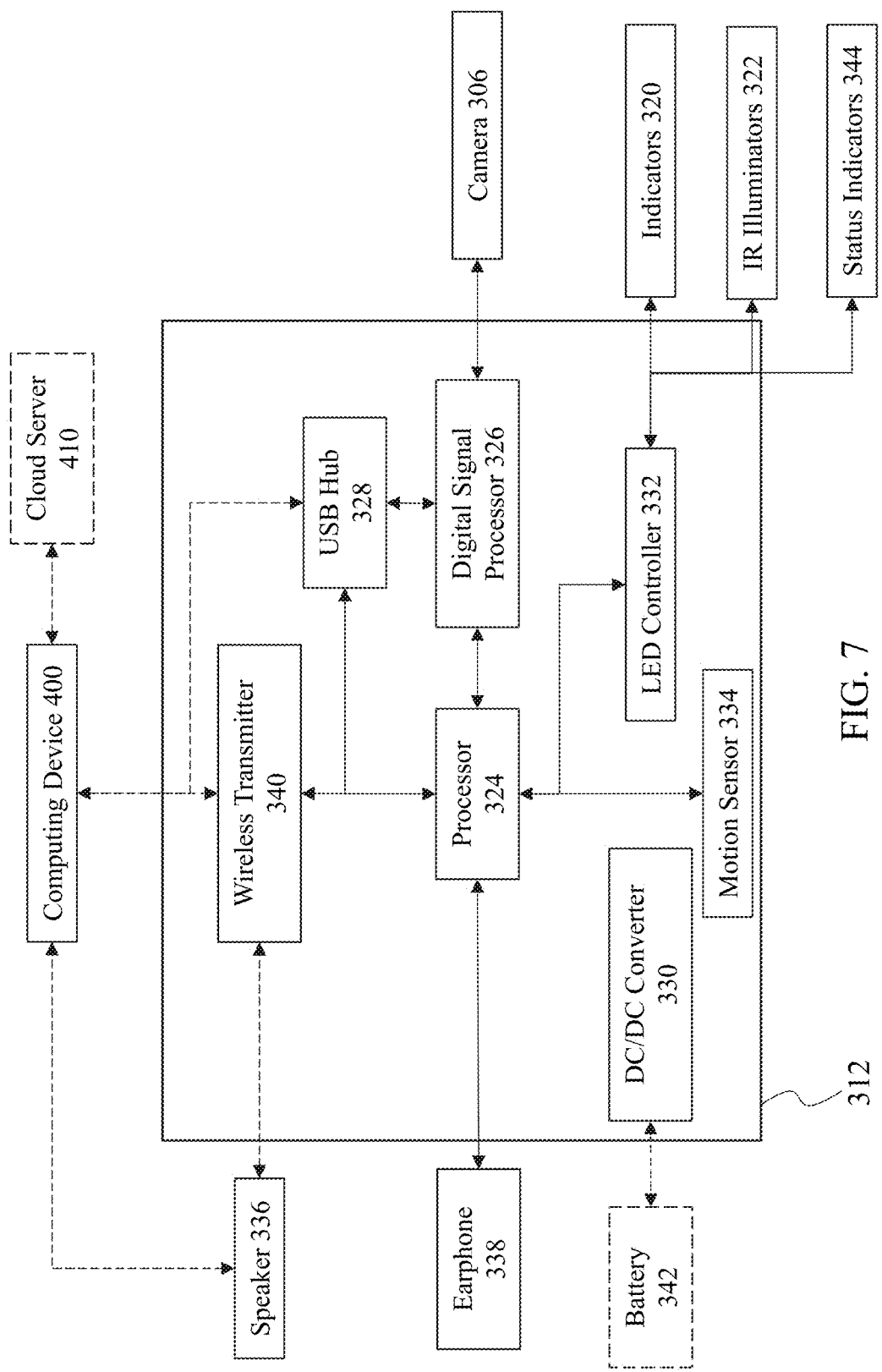
FIG. 7 shows a diagram of the electrical components of a communication system, according to some embodiments.

In some embodiments, eye-gaze tracking device 300 may further include one or more status indicators 344 (see FIG. 7). Status indicators 344 may provide feedback to a caretaker regarding the status of device 300. For example, status indicators 344 may indicate that calibration is ongoing or complete. Status indicators 344 may further provide an indication of the charge level of the battery of device 300 (e.g., changing color to indicate a low battery). Status indicators 344 may be, for example, LEDs. Status indicators 344 may be positioned anywhere on device 300. For example, in one embodiment, status indicators 344 are coupled to housing 312.

As described in greater detail herein, when the user focuses his/her gaze on one particular indicator 320, camera 306 tracks the user's gaze and identifies at which indicator the user is directing his gaze. This may result in the selection of a character/word/sentence or action, which is mapped to that particular indicator 320. For example, and as described further herein, in some embodiments, the user can decide the selection he wants to make by matching the color of the column/row of a communication board that contains the desired word, character, phrase or action with the color of indicator 320 on the indicator support 310 placed in his/her field of vision. Exemplary communication systems with which eye-gaze tracking device 300 may be used are described in more detail herein and in U.S. patent application publication number 2016/0246367, which is incorporated herein by reference in its entirety.

In various embodiments, indicator support 310 is mounted on support arm 308 such that the position of indicator support 310 may be adjusted along one or more axes. In at least one embodiment, indicator support 310 has three degrees of freedom with reference to body 302. This configuration allows indicator support 310 to be positioned in the optimal position based on the user's pupillary distance and individual comfort, in order to minimize strain to the eyes. For example, indicator support 310 may have translational motion in the X-, Y-, and Z-directions. In some embodiments, this adjustability is achieved by providing the arms with parts that slide over each other along respective axes (i.e., telescope). Optionally, support arm 308 may include detents or other features to lock the respective degrees of freedom in desired positions. In some embodiments, support arm 308 is constructed of memory wire, such as that used in jewelry. In such embodiments, the memory wire may allow support arm 308 to be formed into a desired shape to position indicator support 310 in the appropriate position. Further, in such embodiments, the memory wire may be reformed as needed to adjust the position of indicator support 310.

In some embodiments, camera 306 operates in the infrared ("IR") band. In other words, it captures the images of the user's eye using infrared reflections from the user's eye. In such embodiments, camera 306 is fitted with a filter that only allows IR light to go into the camera and blocks all the visible and ultraviolet ("UV") light from entering into the camera. The resulting image is a grayscale image that has a resolution that may be superior to an equivalent RGB image. In some embodiments, the camera lens includes a macro lens allowing the camera to be positioned at distances greater or lesser than 5 cm from the user's eye.

Figure 6:
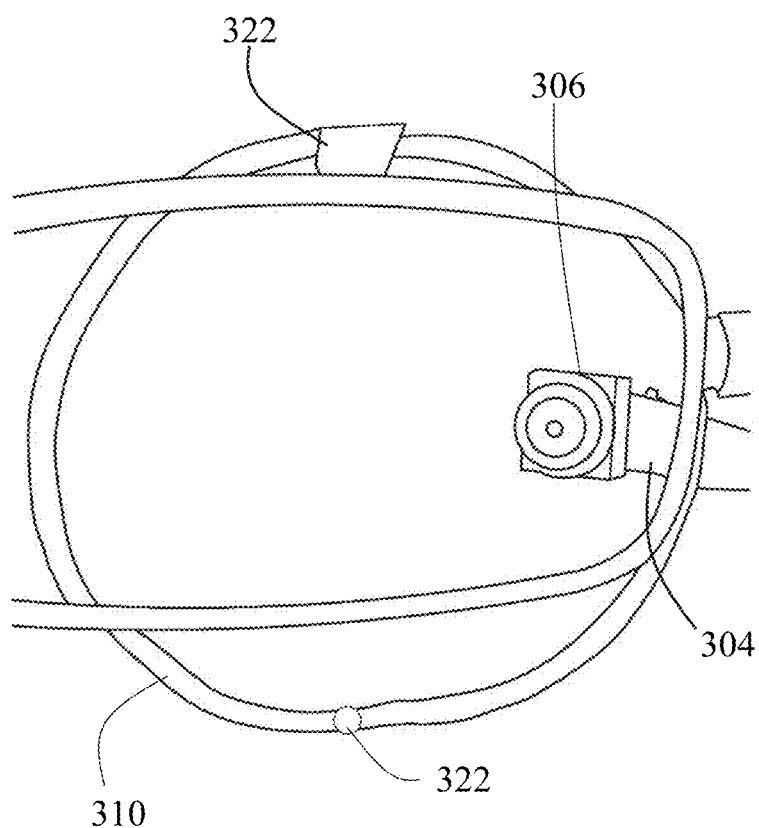
FIG. 6 shows a detail view of IR LEDs of the eye-gaze tracking device of FIG. 2.

In some embodiments, such as embodiments in which the camera operates in the IR band, an IR illumination source is provided to provide a sufficiently bright image to be "visible" to camera 306. For example, as shown in FIG. 6, one or more IR LEDs 322 may be affixed to, or disposed in, indicator support 310. For example, IR LEDs 322 may be positioned between indicators 320 within indicator support 310. As shown, in one embodiment, a first IR LED 322 is affixed to the top of indicator support 310 and a second IR LED 322 is affixed to the bottom of indicator support 310. Any number of IR LEDs 322 may be included. IR is barely visible to the human eye but is visible to a CMOS camera sensor. Hence, the IR illumination does not provide a distraction to the user while still providing a light source for camera 306. The IR LED(s) 322 illuminates the user's eye such that the resulting image should have optimal balance of brightness, contrast and sharpness.

FIG. 7 is a diagram illustrating the electronic components of eye-gaze tracking device 300 and their connection to the other components of system 200 in accordance with some embodiments. These electronic components may include processor 324, a digital signal processor 326, a USB hub 328, a DC/DC converter 330, an LED controller 332, and a motion sensor 334. In some embodiments, two or more of the electronic components are mounted to a single printed circuit board. In other embodiments, each of the electronic components is provided on a separate board. In some embodiments, the electronic components are housed within housing 312 of eye-gaze tracking device 300. It should be understood that this diagram only illustrates one potential embodiment. Other embodiments in which one or more components communicate wirelessly and/or via wired connection are within the scope of this disclosure. For example, in some embodiments, speaker 336 is wirelessly connected to eye-gaze tracking device 300 or computing device 400. In other embodiments, speaker 336 is connected via a wire (e.g., via USB hub 328). In addition, as described herein, in some embodiments, eye-gaze tracking device 300 is powered by battery 342 and in other embodiments it is powered by a wired connection to computing device 400 (e.g., via USB hub 328).

Processor 324 may be, for example, a SoC (System On a Chip) or MCU (Microcontroller). Processor 324 performs the computations and controls described herein. This includes gaze detection, speech synthesis, camera control, display onto a TV or similar display device (e.g., computing device 400), LED control, motion detection, wireless connectivity, and other functionalities. Processor 324 may also provide an interface between USB hub 328 and the LED controller 332 and the motion sensor 334, respectively.

In various embodiments, USB hub 328 splits the single upstream USB bus into two downstream USB connections for processor 324 and digital signal processor 326, respectively.

Digital signal processor 326 provides an interface between camera 306, which may use a camera specific protocol, and processor 324 or an external computing device (e.g., computing device 400). In the illustrated embodiment, the digital signal processing functions are performed by a dedicated processor (i.e., digital signal processor 326), however, in some embodiments, the digital signal processing functions are performed by processor 324 such that digital signal processor 326 may be omitted.

LED controller 332 controls brightness of the indicators 320 as well as the IR LEDs 322. In various embodiments, LED controller 332 may use pulse width modulation to control indicators 320. For example, LED controller 332 may turn one of the plurality of indicators on, or change its brightness, in response to the user directing his gaze at the indicator.

DC/DC converter 330 may be configured to provide the appropriate voltage input to the various components of eye-gaze tracking device 300. For example, motion sensor 334 may use 3.3V power supply and logic, while the rest of the electronics use 5V power supply and the MCU has 3.3V compatible logic.

Motion sensor 334 may be, for example, a 9-axis inertial measuring unit (IMU). Motion sensor 334 may allow the conversion of the user's head movements to be converted to inputs for speech software as will be described in detail herein. Further, in some embodiments, if motion of the user's head is detected by motion sensor 334, an alarm or signal may be provided to a caretaker or medical staff. For example, a substantial movement of the head may indicate that the user has lost consciousness. The alarm or signal may be provided via speaker 336 (FIG. 7).

In some embodiments, eye-gaze tracking device 300 further includes a speaker 336 (e.g., a feedback device). In some embodiments, speaker 336 may be a rechargeable Bluetooth (or other wireless) enabled speaker. Speaker 336 may be used to communicate with others based on text entered into communication boards using eye-gaze tracking device 300, as will be described in more detail herein. In such embodiments, A2DP protocol or any other appropriate Bluetooth protocol may be used.

In some embodiments, eye-gaze tracking device 300 may further include an earphone 338 (e.g., a feedback device). Earphone 338 may allow eye-gaze tracking device 300 to provide feedback and guidance to the user/patient regarding operation of eye-gaze tracking device 300. For example, feedback may be provided to the user regarding the selections being made by the user. In addition, instructions may be provided to the user during calibration, as will be described in more detail herein.

In various embodiments, eye-gaze tracking device 300 further includes a transmitter 340, as shown in FIG. 7. In some embodiments, transmitter 340 is a wireless transmitter 340 that allows for wireless communication with computing device 400, speaker 336, and earphone 338. For example, wireless transmitter 340 may, for example, communicate with these devices using Bluetooth, WiFi, or other wireless protocols. Although transmitter 340 is described as a wireless transmitter, one of ordinary skill in the art will understand that transmitter 340 could also be implemented as a wired transmitter and/or include both wired and wireless transmission capability.

In various embodiments, eye-gaze tracking device 300 further includes a battery-based power supply 342. The battery-based power supply 342 may have the capability of supplying regulated power to eye-gaze tracking device 300. In some embodiments, battery 342 is rechargeable to allow portability of the device. In other embodiments, battery 342 is a non-rechargeable battery. Such an embodiment may have a higher energy density than a comparable rechargeable battery, thereby allowing for longer run times. Such batteries may also be more appropriate in developing countries where electrical service is intermittent or non-existent. In other embodiments, eye-gaze tracking device 300 is RF-powered (i.e., powered via ambient RF sources). In yet still other embodiments, eye-gaze tracking device 300 is powered by a wired connection, either via an outlet or from computing device 400.

In some embodiments, eye-gaze tracking device 300 may communicate with computing device 400 (e.g., via wireless transmitter 340). This allows the user to view communication boards or graphical user interfaces and interact with them using eye-gaze tracking device 300.

In some embodiments, eye-gaze tracking device 300 may also communicate with other devices, such as virtual assistants (e.g., Amazon Alexa, Apple Siri, etc.). This may allow the user to operate pre-defined functions on these devices.

In some embodiments, eye-gaze tracking device 300 in its fully functional, ready-to-use state, weighs approximately 20 grams not including the battery and approximately 40 grams with the battery. The weight may be balanced on both sides of the prescription glasses by placing body 302 on one arm of the eyeglasses and the battery on the other. Further, eye-gaze tracking device 300, being compact, does not require any large setups which may obstruct the field of vision of the user. In some embodiments, it can be used without any external computing devices or display units. In some embodiments, the device, including the battery, fits in a box with approximate internal dimensions of 12 cm×9 cm×3 cm (l×b×h). This allows the device to be portable. Further, the device has other simple configurations which can be selected based on the range of eye movement for every patient and thus, accommodates the needs of every user.

The usage of eye-gaze tracking device 300, once set up, is easy to understand by the user. In some embodiments, step-wise instructions are provided via audio instructions to the user (e.g., via earphone 338) to help him/her use the device. As the position of camera 306 with respect to the eye does not change, minimal calibration is required after the initial setup.

Software

In another aspect described herein, software allowing an individual to communicate with others is provided. Such software may allow for communication based on a signal received from eye-gaze tracking device 300, described above.

In some embodiments, images are captured (e.g., by camera 306) to be used for training a neural network. Once trained, the neural network uses captured images (e.g., by camera 306) to identify the user gaze direction. The detection accuracy may depend on the number of images captured, correct image tagging, image sharpness, contrast and detail as well as other factors.

In various embodiments, the images of the user's eye movement in different directions are captured and used to train the system to learn the pattern of eye movements. This may enable the device to use this trained network to predict the gaze point of the user without complicated calibration, thus, avoiding errors/incorrect selections caused due to inaccurate calibration.

In some embodiments, usage of the system can be considered to fall into two phases: (1) a calibration phase; and (2) a usage phase.

Figure 8:
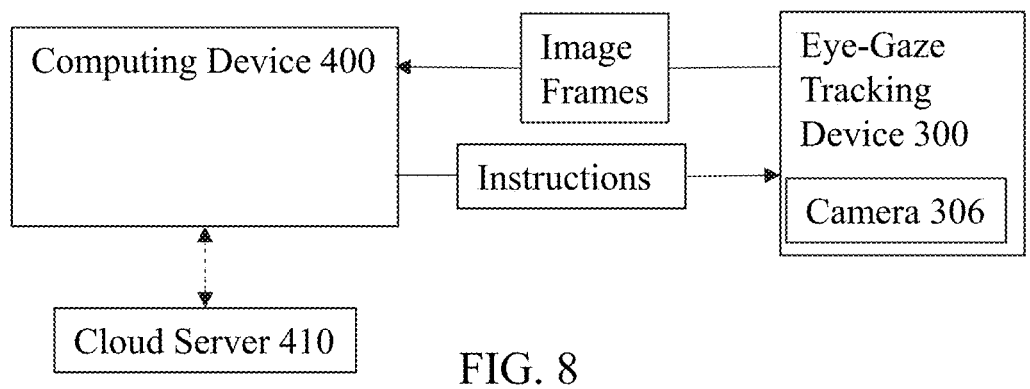
FIG. 8 shows a flow diagram of a calibration process of a communication system, according to some embodiments.

FIG. 8 shows an exemplary calibration process in accordance with some embodiments. During the calibration phase, images are captured from camera 306 for teaching a neural network (NN). The captured images are transferred to computing device 400. The NN training operations may be performed by a processor of computing device 400. Alternatively, as shown in FIG. 1, computing device 400 may communicate with cloud server 410 and cloud server 410 may perform the NN training operations. Instructions may be provided to eye-gaze tracking device 300 by computing device 400 to provide guidance to the user (e.g., audible instructions through speaker 336) to complete the calibration. The finalized NN configuration may be transferred to the eye-gaze tracking device 300 (e.g., processor 324) such that during the usage phase gaze recognition may be performed by eye-gaze tracking device 300. Alternatively, during the usage phase, gaze recognition may be performed by computing device 400. During the calibration phase, eye-gaze tracking device 300 and computing device 400 can be communicatively connected (e.g., by a USB cable or wirelessly).

Figure 9:
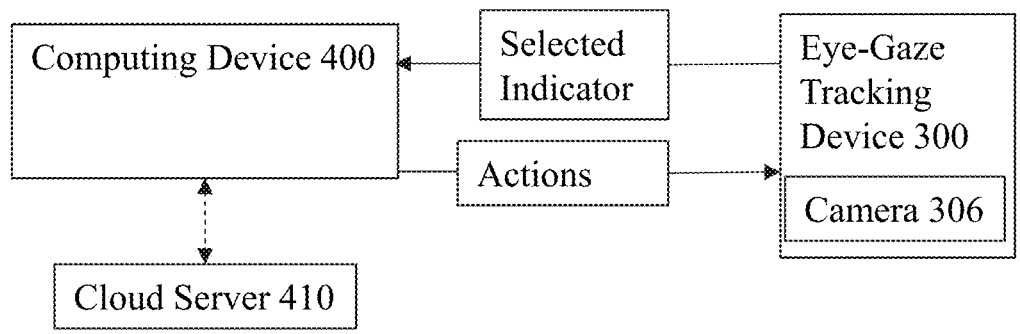
FIG. 9 shows a flow diagram of a process for using a communications system, according to some embodiments.

FIG. 9 shows an exemplary process during the usage phase. When operating in the usage phase, images are captured by eye-gaze tracking device 300 and these images are analyzed by processor 324 using the NN. The indicator at which the user is directing his gaze is relayed to the computing device 400. Based on the result of the analysis, computing device 400 sends instructions to eye-gaze tracking device 300 to perform various actions (e.g., LED brightness changes or messages to be spoken through speaker 336). In various embodiments, during the usage phase, eye-gaze tracking device 300 communicates wirelessly with computing device 400 (e.g., using Bluetooth or WiFi). In some embodiments, certain processes may be performed by cloud server 410.

In one embodiment, system 200 may be auto calibrated. In such embodiments, a care-giver can place eye-gaze tracking device 300 on the user's glasses and place the glasses on the user. The care-giver may then press one or more buttons (e.g., located on a box associated with eye-gaze tracking device 300, on eye-gaze tracking device 300 itself, or on computing device 400) to start the system. System 200 then automatically invokes the auto calibration routine and guides the user to start using system 200.

Figure 10:
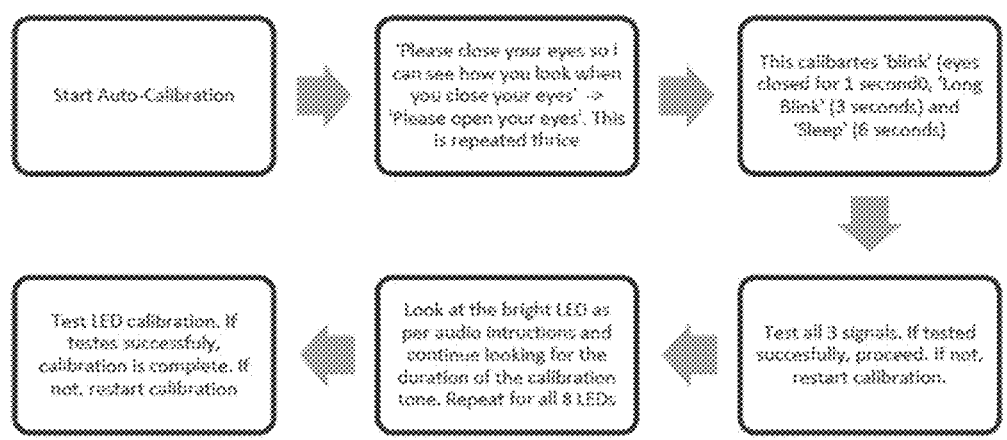
FIG. 10 shows exemplary instructions provided to a user during calibration of a communication system.

In various embodiments, the calibration may be performed by the user himself by following the instructions provided in the form of audio instructions. For example, these instructions may direct the user to focus his/her gaze in a certain direction and/or blink for set durations to capture the images. In addition, the instructions may direct the user to perform motions such as head motions or operation of foot or knee switches (described in more detail herein). FIG. 10 shows some exemplary instructions that may be provided to the user during calibration. For example, an audible instruction may be provided to the user to close and open his eyes at specific times. The user may then be instructed to direct his eyes at specific indicators.

Once the calibration routine is complete, the user can start using system 200 for communication. The user may perform the auto-calibration routine again if required. However, in at least some embodiments, calibration is not required after initial setup.

Using the auto-calibration methods described herein, after the caregiver places the glasses on the user and activates the auto-calibration routine, the rest of the calibration can be completely managed by communications between system 200 and the user. In other words, there would be no need for a trained care-giver to assist the user.

In some embodiments, system 200 uses IR illumination in conjunction with the circle Hough Transform (CHT) method to detect the pupil. The CHT method identifies the pupil based on eye geometry. Once the pupil is detected, the focus is set on the pupil and the camera follows the pupil as the user shifts his/her gaze from one indicator 320 to another while calibrating or during use. This enables accurate detection of the user's eye movements.

The CHT is a technique used in digital image processing, for detecting circular objects in a digital image. CHT is a feature extraction technique for detecting circles. It is a specialization of the Hough Transform. The purpose of the technique is to find circles in imperfect image inputs. The circle candidates are produced by "voting" in the Hough parameter space and then select the local maxima in a so-called accumulator matrix.

System 200 may allow the user to use any appropriate type of communication board to allow the user to communicate. The communication boards allow the user to make selections from a range of characters, words, phrases and/or actions. This is then converted by the system to speech/text. Exemplary communication boards are described herein. System 200 may also use any of the communication boards described in U.S. patent application publication number 2016/0246367, which was previously incorporated by reference herein.

Figure 11A:
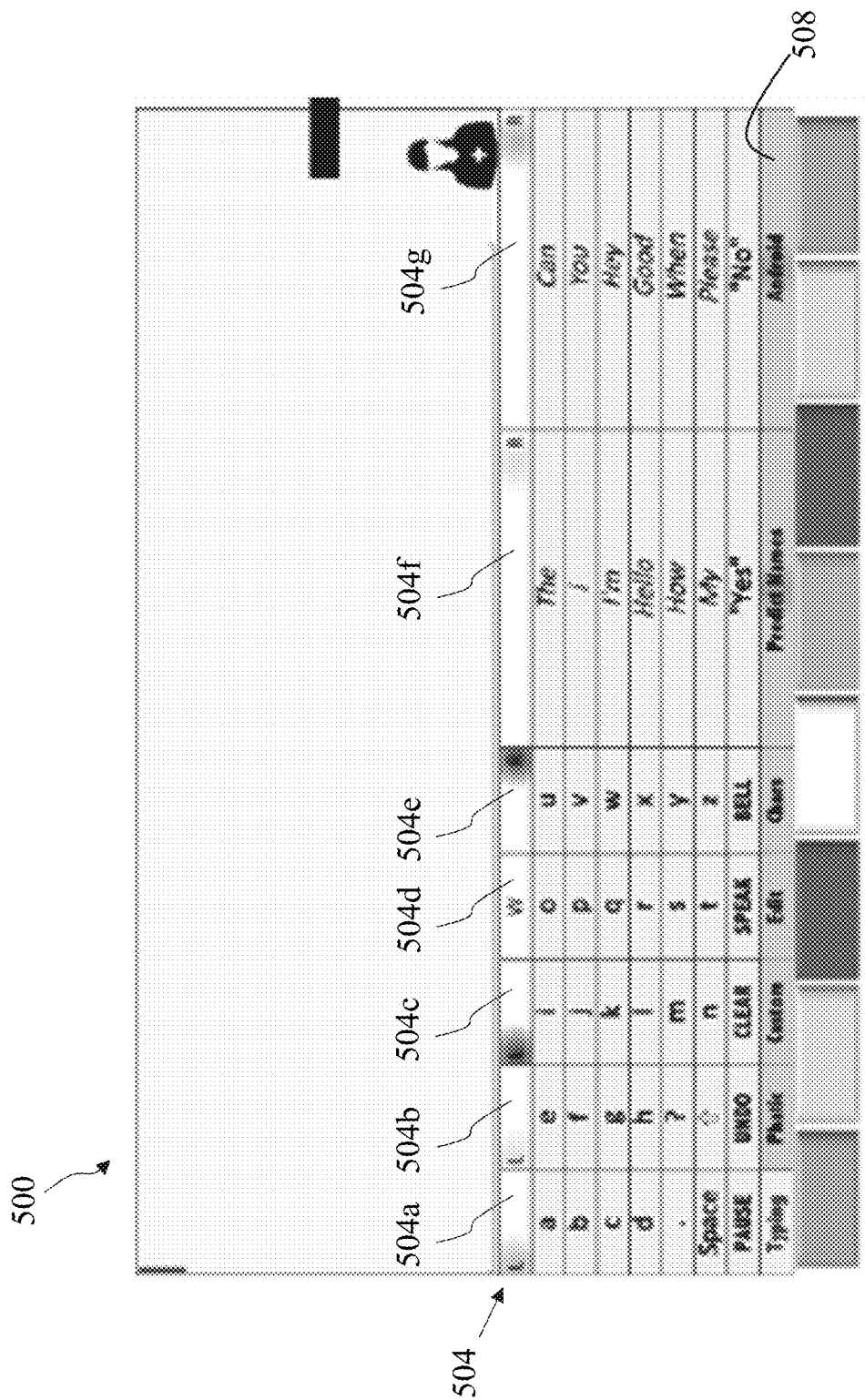
FIGS. 11A-11B show a communication board, according to some embodiments described herein.

Once the user completes the calibration phase described above, he/she can move to the communication boards described herein. For example, in one embodiment, the user may move to the communication board 500 shown in FIG. 11A. The user can see the several characters, words, phrases and actions and make selections as required. The communication boards may be displayed on display unit 402 of computing device 400 so that the user can view the communication boards.

A letter or word from communication board 500 may be selected by the user using a two-step selection process. For example, initially, each element in the top row 504 may be displayed with an, at least partially, colored background. In addition, the side on which the color displayed may correspond to the side of indicator support 310 on which the corresponding indicator is positioned. For example, in one embodiment, element 504a has a green indicator on its left side, element 504b has a yellow indicator on its left side, element 504c has a red indicator on its left side, element 504d has a completely white background, element 504e has a red indicator on its right side, element 504f has a yellow indicator on its right side, and element 504g has a green indicator on its right side. Further, the elements may include the letters "L" or "R" respectively to indicate the side of indicator support 310 to which it corresponds. In other embodiments, the elements may include the words "Left" and "Right."

In order to select a letter or word from communication board 500, the user first selects a column that contains the desired word or letter. For example, in order to select the letter "h" the user would first select the corresponding column by selecting element 504b by directing his gaze at the yellow indicator on the left side of indicator support 310

Figure 11B:
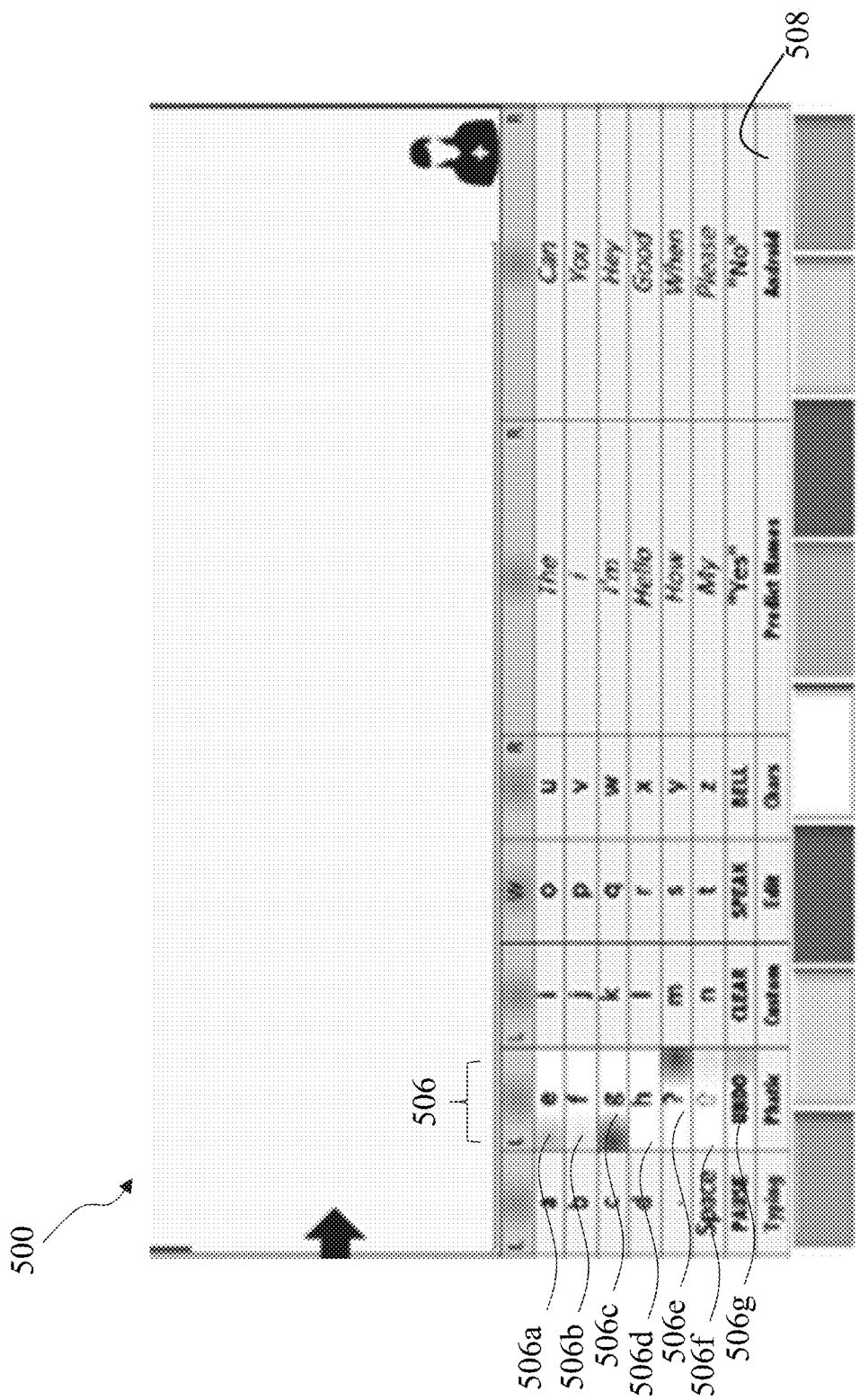

After selection of element 504b, each of the elements in the corresponding row is shown with a partially color-coded background, as shown in FIG. 11B. For example, in one embodiment, element 506a has a green indicator on its left side, element 506b has a yellow indicator on its left side, element 506c has a red indicator on its left side, element 506d has a completely white background, element 506e has a red indicator on its right side, element 506f has a yellow indicator on its right side, and element 506g has a green indicator on its right side. The side on which the color indicator is displayed may correspond to the side of indicator support 310 on which the corresponding indicator is positioned. For example, to select the letter "h" (element 506d) the user would direct his gaze at a white indicator on indicator support 310.

This process may be repeated by the user to form words and/or phrases so that the user can communicate with others. These words or phrases may be broadcast using speaker 336.

Communication board 500 may also allow for navigation to other apps on computing device 400. For example, as shown in FIG. 11, communication board 500 may include an element 508 that allows the user to enter a graphical user interface. Element 508 can include any appropriate textual reference (e.g., an "Android" button). Selection of such a button may allow the user to exit communication board 500 and use apps such as, for example, Netflix, Gmail, and Kindle on the computing device, as described further herein. In other embodiments, elements corresponding to such applications may be included directly in communication board 500, thereby allowing the user to open these applications directly from communication board 500.

In various embodiments, selection of element 508 may cause a graphical user interface (GUI) 600 to be displayed, as shown in FIGS. 12A-12F. These figures show how a user can open an application 602 (e.g., an email application such as Gmail) using system 200. As illustrated, the user can use a grid to move the cursor to the desired application. As shown in FIG. 12A, selection row 604 may include a first grid icon 606a and a second grid icon 606b. When one of the grid icons 606a, 606b is selected, a grid is displayed on the corresponding side of GUI 600. As shown in FIG. 12B, when the user selects grid icon 606b a grid is displayed on the right side of GUI 600. In various embodiments, each of icon 606a and 606b corresponds to an indicator supported by indicator support 310.

The grid is made up of a plurality of elements, each corresponding to a respective one of indicators 320 supported by indicator support 310. For example, as shown in FIG. 12B, the grid may include six elements (608a-608f). In order to select an application, the user directs his gaze at the indicator corresponding to the grid element that is displayed over the desired application icon (e.g., based on a correlation of color and/or position). For example, to select the email application icon 602. The user directs his gaze at the indicator corresponding to element 608a. After selection of element 608a, a second grid is displayed in the area of element 608a, subdividing this area into a similar grid. The user again directs his gaze at the indicator corresponding to the grid element that most closely covers the desired application icon (e.g., element 610a). As shown in FIGS. 12D and 12E, this process is repeated until the grid is completely over the desired icon. The user may then select the application by directing his gaze at a pre-defined indicator (e.g., a white LED) corresponding to the selection function (e.g., as indicated by icon 612), as shown in FIG. 12F.

Figure 17:
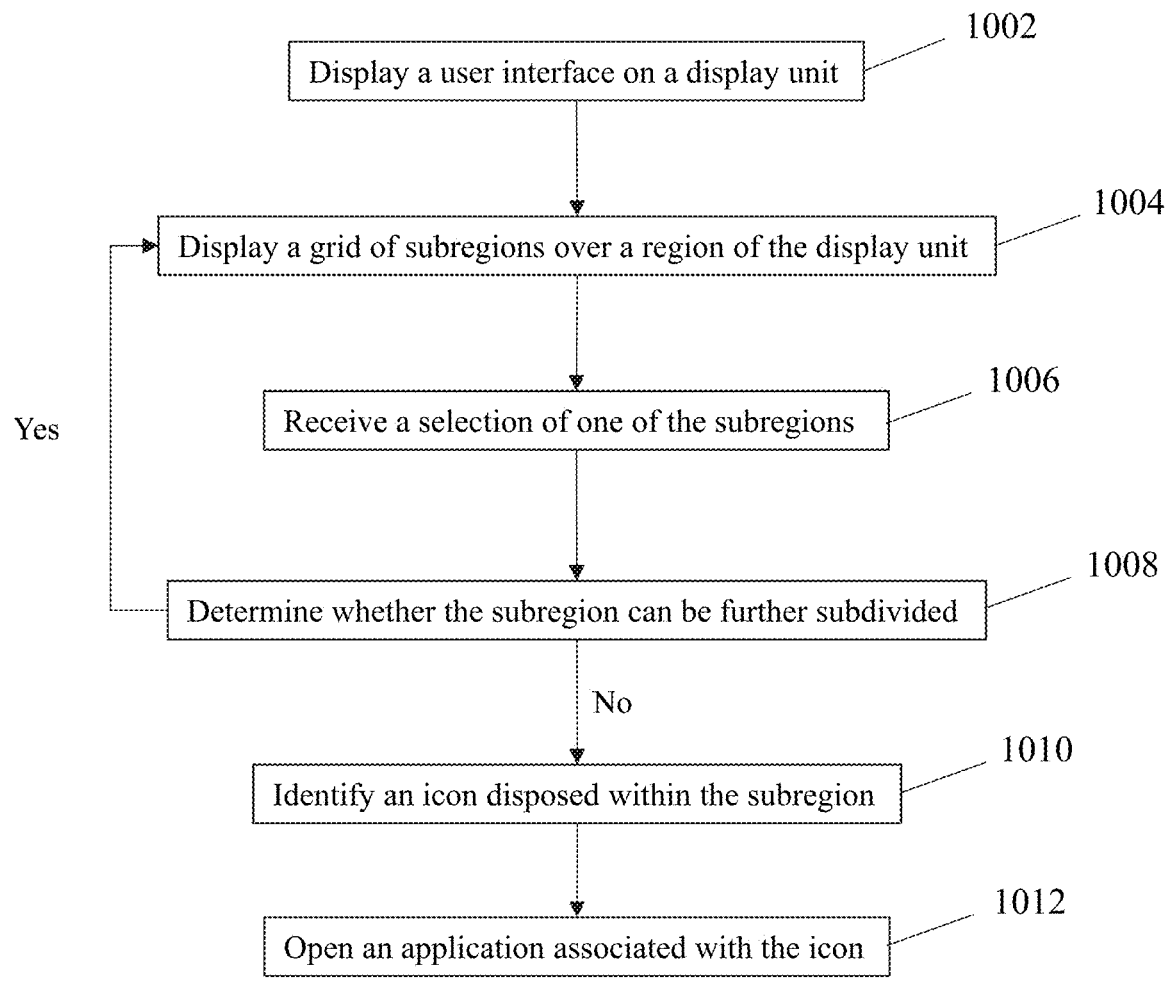
FIG. 17 shows a flowchart of a method of opening an application, according to some embodiments described herein.

FIG. 17 illustrates a method of guiding a user's selection of an icon in a GUI, such as that shown in FIGS. 12A-12F. At block 1002, the system displays a user interface on the display unit. At block 1004, the system displays a grid of subregions over a region of the display unit. At block 1006, the system receives the user's selection of one of the subregions (e.g., one of elements 608a-608f). At block 1008, the system determines whether the subregion can be further subdivided. If so, the system returns to block 1004 and further subdivides the region. If not, the system identifies an icon disposed within the subregion at block 1010. At block 1012, the system opens an application within the subregion. The system may automatically open the application when the region cannot be further subdivided (e.g., the region is smaller than a threshold size). Alternatively, further input from the user may be required.

In each of the selection steps, any number of grid elements may be displayed. In addition, any number of selection steps may be used to position the cursor over the desired icon to make the selection.

System 200 may also be equipped with simpler communication boards that can accommodate patients with a lower range of eye movement and ones who have some functionality in other muscles (fingers, toes, neck). These communication boards are explained below.

Communication board 700, shown in FIG. 13, may be particularly suited for patients with minimal signaling capability due to limited muscle movement, minimal eye visibility due to conditions like drooping eyelid syndrome and lack of control over eye movements. In some embodiments, as described herein, communication board 700 scans through lists of actions, characters, words and phrases. In some embodiments, the scanning speed is user-dependent. For example, many users develop memorized, anticipatory capabilities allowing the system to scan relatively quickly as the user knows the next few options and signals the system to pick an option before it is shown or announced; speeds of moving by two selections per second are not unusual. New users or severely impaired users may require slower scan speeds to allow enough time to pick an option before the selection moves on. For example, some users may need several seconds from the moment a selection is displayed and announced to when the pupil begins moving and another several seconds for the pupil to move from center to an indicator.

Figure 13A:
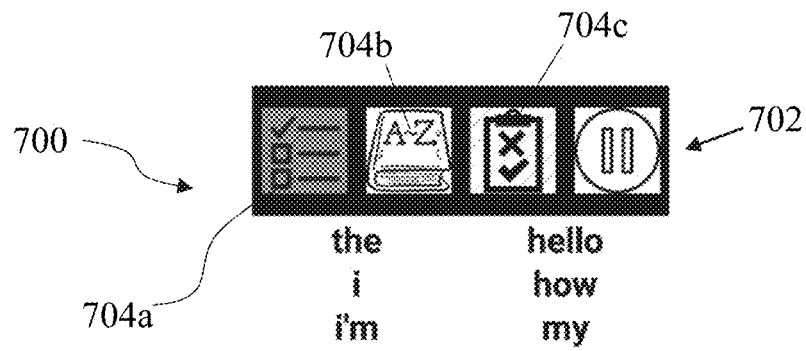
FIG. 13A-13F show a communication board, according to some embodiments described herein.

As shown in FIG. 13A, communication board 700 includes a home row 702 with a plurality of icons 704a, 704b, and 704c that each correspond with methods of forming speech or text. The user can select one of the icons by directing his gaze at an appropriate indicator 320 or using any other selection method, including those described herein (e.g., using finger switches, a foot switch, head movement, etc.).

Figure 13B:
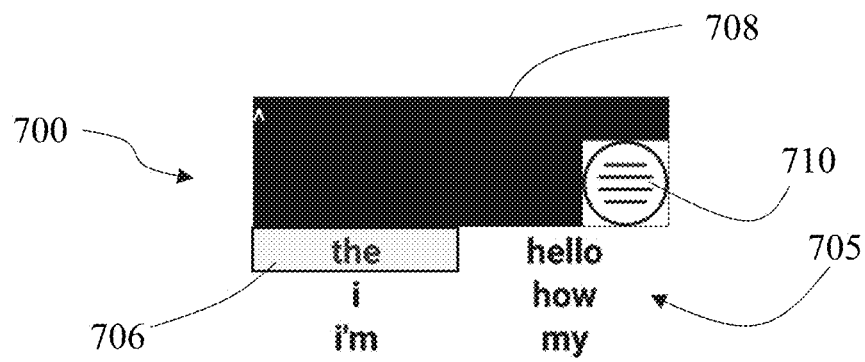
Figure 13C:
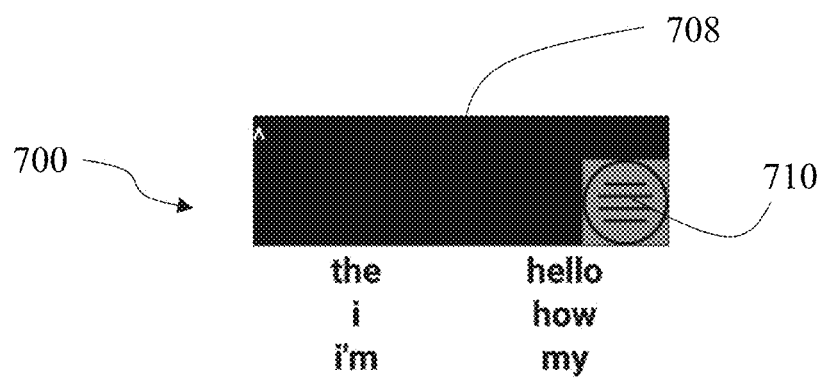

Selection of one of the icons (e.g., icon 704a) may allow the user to select individual words, as shown in FIG. 13B. A plurality of potential word selections are shown in a selection window 705. The system scans through the words by highlighting each individual word in some way. For example, each word may be sequentially highlighted with a bounding box 706. Bounding box 706 may be a different color than the remainder of selection window 705 to make it easy to distinguish the word that is currently being highlighted. When the user desires to select the highlighted word, he signals his selection using any of the selection methods described herein or any other appropriate selection method. For example, the user may select the word "the" when that word is highlighted. The selected word is entered into the text window 708 so that the user can see the selections that have been made. After selection of the word, the possible selections displayed in selection window 705 are updated with new potential selections. Predictive algorithms may be used to determine appropriate words to display based on the user's previous selections to allow the user to quickly complete sentences and phrases.

When the user has completed forming the desired sentence or phrase, the user may allow the system to scan through each of the displayed selection options. The cursor may then move to an action screen icon 710, shown in FIG. 13C. As will be described further herein, selection of action screen icon 710 causes an action menu to be displayed in selection window 705.

Figure 13D:
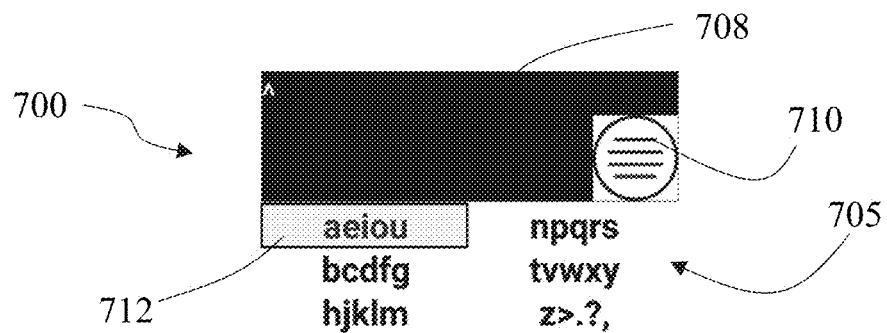

Selection of icon 704*b* in FIG. 13A allows the user to select individual letters to be added to the text window 708. As shown in FIG. 13D, upon selection of icon 704*b*, potential alphabetic selections are displayed in selection window 705. As described above, the user may select any of the alphabetic selections as the system scans through them. Upon selection, the corresponding letters will then be displayed in selection window 705 for selection by the user. For example, selection of item 712 causes the individual letters "a," "e," "i", "o", and "u" to be displayed as potential selections in selection window 705. The user may then select the desired letter using the process described above to add the letter to text window 708.

Figure 13E:
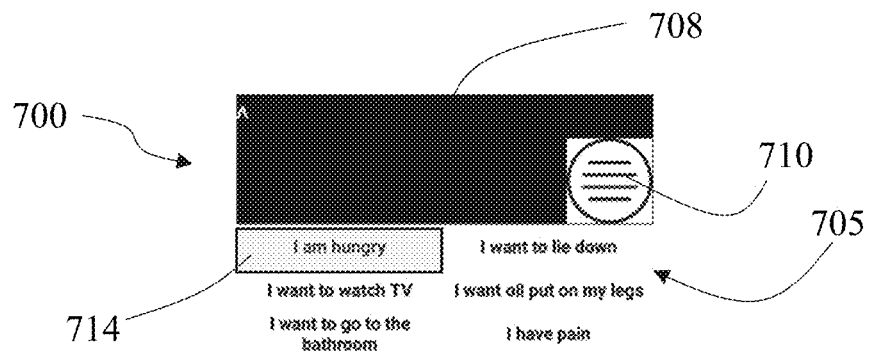

Selection of icon 704*c* in FIG. 13A allows the user to select pre-programmed phrases, as shown in FIG. 13E. These phrases may be selected based on phrases commonly needed by the user or users with similar conditions of the user. For example, the user may select icon 714 to add "I am hungry" to text window 708.

Figure 13F:
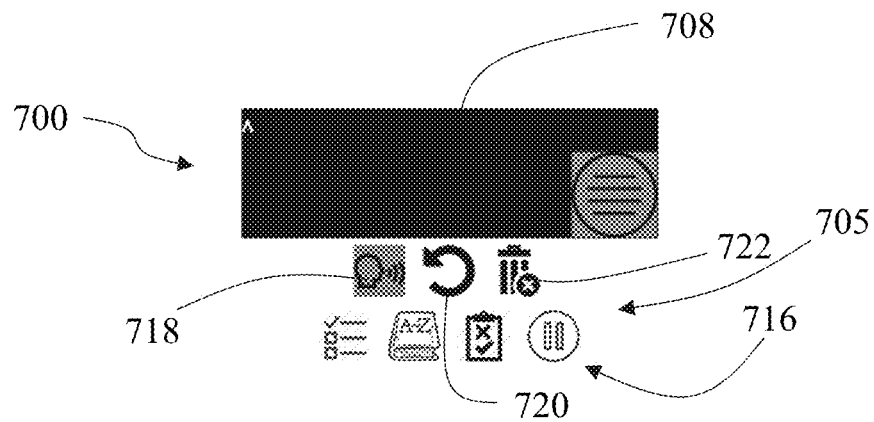
Figure 14:
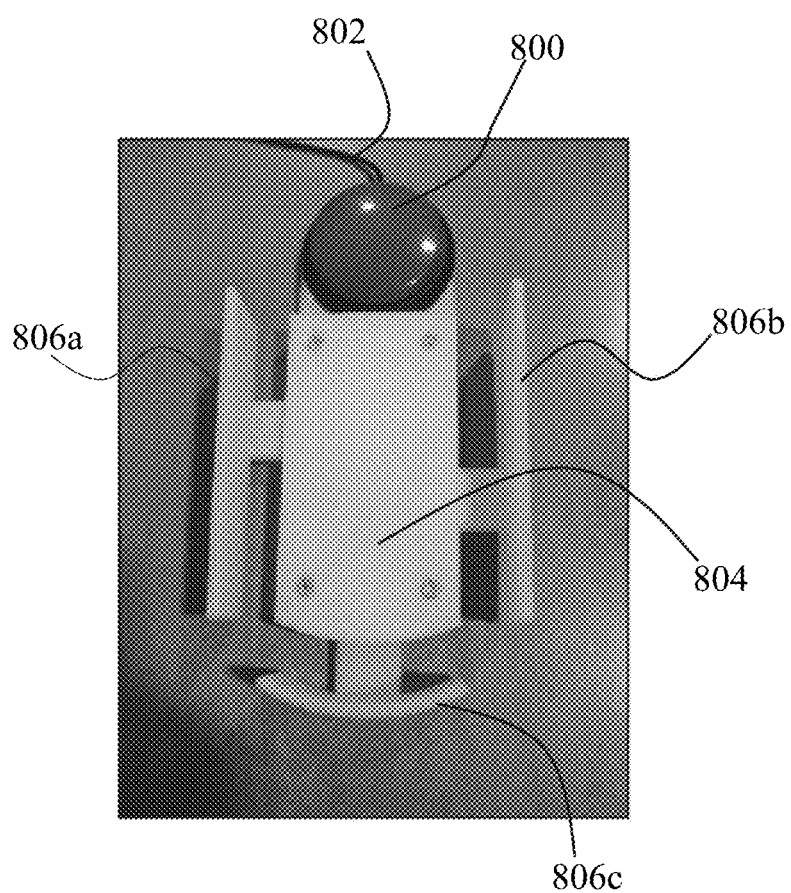
FIG. 14 show a foot switch, according to some embodiments described herein.

With any of the potential selections displayed in selection window 705, the user may allow the selection icon to move to action screen icon 710. Selection of action screen icon 710 causes action menu 716 to be displayed in selection window 705, as shown in FIG. 13F. Using a selection process similar to those described above, the user may select any of the icons displayed in selection window 705. For example, icon 718 may cause the system to speak the text in text window 708 through speaker 336. Selection of icon 720 may undo the last selection by the user. Selection of icon 722 may delete all of the text in text window 708. In addition, icons corresponding to icons 704*a-c* may be displayed and selection of these icons may cause the corresponding selection options to be displayed in selection window 705.

As described above, communication board 700 allows users with very limited muscle control to form speech using only one method of selection. Communication board 700 is intuitive and easy to use, even for untrained users.

Based on his/her requirement, the user can make a selection using the best possible means of signaling based on his/her muscle control capability (eye movement, blink, finger/toe movements, etc.). These selections may be identified by, for example, eye-gaze tracking device 300 (e.g., using camera 306 or motion sensor 334). For example, by directing the user's gaze at a specific indicator, the user may select the word currently highlighted in selection window 705.

Selection Using Inputs Other than Eye Movement

In various embodiments, as mentioned above, input signals other than the user's eye movement may be used by system 200. To use the communication boards described herein effectively, a signal best suited for the respective patient's needs may be assigned as a trigger for selection. Exemplary signaling methods include a switch, eye movement in any direction (up/down or left/right), blinking of the user's eyes, or head motion.

FIG. 13 is one example of a communication board that may be used by a user using head motion, AAC Switches, eye blink and/or a limited number of eye gaze directions, as well as using EMG signals (whether or not muscle contraction actually occurs), or via EEG sensors. In order to use selection methods, the user or a caregiver may go to an "Event Assignment" screen to assign the signals to desired actions to be performed by the system.

In some embodiments, if the user still has some movement ability intact in his fingers and toes, the user can use a switch or switches as a selection signal. Depending on the user's capability any number of switches can be used. For example, in one embodiment, one, two, three, or four switches can be connected to system 200. Each switch may correspond to a particular action (move right/left, up/down, etc.) within the communication boards or on graphical user interfaces. For example, if three switches are connected, the user or a caregiver may assign switch one to move the cursor left, switch two to move it right and switch three as a trigger to make the final selection. The actions can also be performed using a combination of switches and eye movements. For example, switch one to move left, switch two to move right and an eye blink as a trigger to make the final selection. The switches may be calibrated and tested in the calibration screen before assigning it to any action.

This functionality is particularly useful for patients with a combination of intact muscle movements. For example, for a user who can move one index finger of his/her palm and has some eye movement (e.g. blinking), he/she can use a combination of switches and eye movement. This may enable him/her to communicate faster using the communication boards.

The switches may be connected to the system in any appropriate manner. For example, a switch may be connected to eye-gaze tracking device 300 via a wired connection. The port to which the switch is connected may correspond to an icon on the display unit 402, thereby providing feedback that the switch must be calibrated. For example, if the switch is connected to the port labelled '1', switch 1 has to be calibrated and assigned to an action in the event assignment screen.

Figure 15:
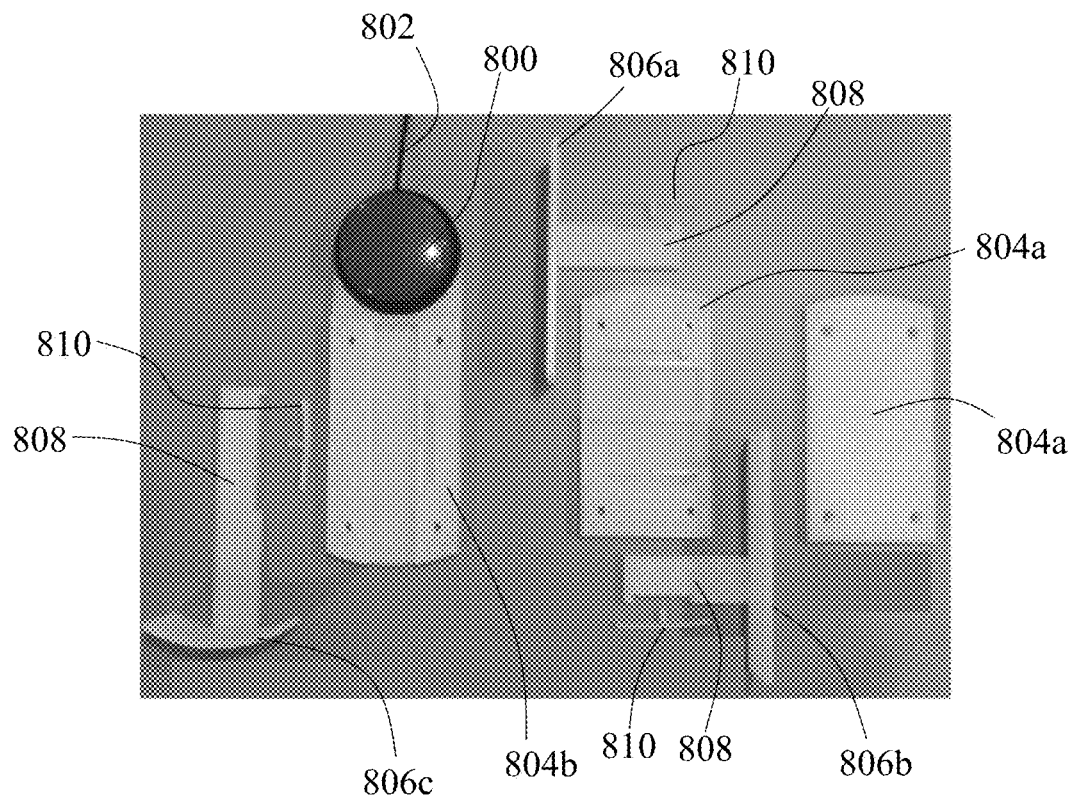
FIG. 15 shows the components of the foot switch of FIG. 14.
Figure 16:
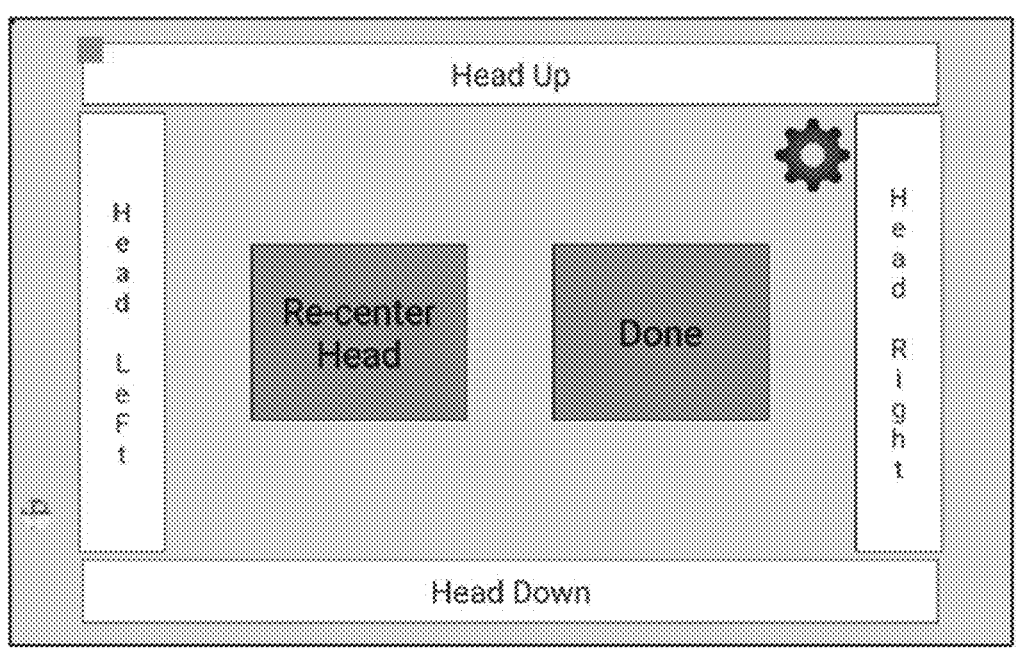
FIG. 16 shows a calibration screen for using head motion to operate a communication board.

In some embodiments, switches can be operated by the foot or knees. This may be appropriate in cases where the user still has some muscle movement in his/her feet/foot or knees. FIG. 17 shows one embodiment of a foot switch 800. Switch 800 can be connected to eye-gaze tracking device 300 via a wire 802. Switch 800 may also be attached to a foot plate 804 upon which the user can rest his foot. Foot plate 804 may include guide plates 806 to retain the users foot in the proper position to activate switch 800. Guide plates 806*a*, 806*b* may be on each side of foot plate 804 and guide plate 806*c* at the rear of foot plate 804 to retain the user's heel. Guide plates 806 are adjustable in length and width to accommodate different foot sizes comfortably. As shown in FIG. 15, in some embodiments, guide plates 806 have arms 808 that include ratcheting teeth to allow adjustment of guide plates 806 with respect to foot plate 804. Foot plate 804 may include a top plate 804*a* and a bottom plate 804*b* between which arms 808 are disposed. Engagement members 810 may also be disposed between top plate 804*a* and bottom plate 804*b*. Engagement members 810 engage arms 808 of guide plates 806 to retain guide plates 806 in position. Switch 800 at the front of the plate can be operated with the user's toes. A similar arrangement may be used for switch operation using knee movement.

In some cases, system 200 may allow the user to use head motion to interact with communication boards and navigate graphical user interfaces. This may be appropriate where the user still has some neck muscle movement control. As seen in FIG. 19, a calibration screen 900 may allow the user to calibrate head motion to be used as an input for use with communication boards. Simply by centering the head and then moving it left, right, up and down the head motion may be calibrated. The respective directions may be highlighted on calibration screen 900 to guide the user through the calibration process. After calibration, these head motions can be assigned to actions in the event assignment screen. In various embodiments, the head motion detection is done by motion sensors built into eye-gaze tracking device 300 (e.g., motion sensor 334).

Head motion can be assigned to control the cursor/selection box movement around a communication board. All four head motion directions (up, down, left and/or right) can be assigned to up/down and left/right movement of the cursor and/or selection box.

The ability to use head movement as an input to interact with communication boards and navigate graphical user interfaces may be useful for users with no muscle control in their limbs and limited voluntary eye movement control, while still having some control in their neck muscles.

Blinks of the user's eye and eye gaze directions can also be used as a selection input. These inputs may be captured by camera 306. Once calibrated, these inputs can be used with the communication boards as selection triggers or to navigate within graphical user interfaces. Both these inputs can be assigned for 'move one' and/or 'scan' depending on the user's abilities.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention. All patents and published patent applications identified herein are incorporated herein by reference in their entireties.

We claim:

1. A device, comprising:
    a body comprising a mount configured to attach the body to a pair of eyeglasses;
    an arm extending from the body to a first location in front of the pair of eyeglasses;
    a camera coupled to the arm at the first location, the camera configured to capture images of at least one eye of a user;
    a support arm extending from the body to a second location in front of the pair of eyeglasses, the second location different from the first location;
    an indicator support coupled to the support arm at the second location such that, when the body is mounted to the eyeglasses and the user is wearing the eyeglasses, the indicator support is positioned in the user's field of view and the camera is positioned to obtain images of at least one eye of the user; and
    a plurality of indicators coupled to the indicator support.

2. The device of claim 1, further comprising a transmitter, wherein the transmitter is configured to provide communication with a computing device.

3. The device of claim 2, wherein the transmitter communicates with the computing device using a wireless protocol.

4. The device of claim 1, further comprising a processor, wherein the processor is configured to:
    receive an image from the camera;
    identify the position of a pupil of the user;
    identify one of the plurality of indicators at which the user is directing the user's gaze.

5. The device of claim 4, wherein the processor is configured to use a circle Hough Transform algorithm to identify the position of the pupil.

6. The device of claim 4, wherein the processor is configured to use a neural network algorithm to identify the one of the plurality of indicators at which the user is directing the user's gaze.

7. The device of claim 4, wherein the processor is further configured to identify when the user blinks the user's eyes.

8. The device of claim 1, wherein the camera is fitted with a filter that only allows infrared light to enter the camera's lens and the device further comprises a infrared LED to illuminate the user's eye.

9. The device of claim 1, wherein the support arm is adjustable such that a distance from the indicator support to the body is variable along at least one axis.

10. The device of claim 9, wherein the distance from the indicator support to the body is variable along at least two axes.

11. The device of claim 1, wherein the body is configured to be removable from the pair of eyeglasses.

12. The device of claim 1, further comprising a motion sensor such that, when the device is mounted to the eyeglasses and positioned on the user, the motion sensor is configured to identify movement of the user's head.

13. The device of claim 1, wherein the indicator support is in the form of a ring and the plurality of indicators are disposed around the circumference of the ring.

14. The device of claim 13, wherein the plurality of indicators are evenly spaced around the ring.

15. The device of claim 1, further comprising:
    a computing device having a display unit;
    wherein, during operation:
    a communication board is displayed on the display unit.

16. The device of claim 1, further comprising a foot switch, wherein the foot switch is in communication with the computing device, and wherein the foot switch is operable by the user to select an option from the communication board.

17. The device of claim 1, further comprising a motion sensor enabling the user to select an option from the communication board by moving the user's head.

18. A computer-implemented method, comprising:
  displaying a user interface on a display unit;
  displaying a first grid over a first region of the user interface, the first grid defining a plurality of discrete second regions;
  identifying, of the plurality of discrete second regions, a first selected region;
  displaying a second grid over the first selected region, the second grid defining a plurality of discrete third regions;
  identifying, of the plurality of discrete third regions, a second selected region;
  identifying an icon disposed within the second selected region; and
  opening an application associated with the icon.

19. The computer-implemented method of claim 18, further comprising:
  providing a plurality of indicators in a user's field of view, wherein each of the plurality of indicators corresponds to one of the plurality of discrete second regions; and
  identifying a selected indicator, the selected indicator being, of the plurality of indicators, the indicator at which the user is directing the user's gaze, the selected indicator corresponding to the first selected region.

20. The computer-implemented method of claim 18, further comprising receiving a confirmation from an input device of a selection of the icon disposed within the second selected region.

* * * * *